(12) United States Patent
Jung

(10) Patent No.: US 6,842,542 B2
(45) Date of Patent: Jan. 11, 2005

(54) METHOD AND DEVICE FOR CAPACITIVE IMAGE ACQUISITION

(75) Inventor: Stefan Jung, München (DE)

(73) Assignee: Infineon Technologies AG, Munich (DE)

( * ) Notice: Subject to any disclaimer, the term of this patent is extended or adjusted under 35 U.S.C. 154(b) by 663 days.

(21) Appl. No.: 09/801,962

(22) Filed: Mar. 8, 2001

(65) Prior Publication Data

US 2001/0026635 A1 Oct. 4, 2001

Related U.S. Application Data

(63) Continuation of application No. PCT/DE99/02727, filed on Sep. 1, 1999.

(30) Foreign Application Priority Data

Sep. 8, 1998 (DE) .......................... 198 41 001

(51) Int. Cl.[7] .............................. G06K 9/38; G06K 9/00
(52) U.S. Cl. ........................................ 382/272; 382/124
(58) Field of Search ................................. 382/115, 116, 382/124, 126, 133, 173, 218, 225, 272; 356/71; 250/208.1, 221, 556, 557; 340/5.53, 5.83

(56) References Cited

U.S. PATENT DOCUMENTS

| | | | | |
|---|---|---|---|---|
| 4,162,481 A | | 7/1979 | DuVall | 382/272 |
| 5,325,442 A | * | 6/1994 | Knapp | 382/124 |
| 5,812,252 A | * | 9/1998 | Bowker et al. | 356/71 |
| 5,907,627 A | * | 5/1999 | Borza | 382/124 |
| 5,952,588 A | * | 9/1999 | Young | 73/862.626 |
| 5,953,441 A | * | 9/1999 | Setlak | 340/5.83 |
| 5,956,415 A | * | 9/1999 | McCalley et al. | 382/124 |
| 5,978,496 A | * | 11/1999 | Harkin | 382/124 |
| 6,011,859 A | * | 1/2000 | Kalnitsky et al. | 382/124 |
| 6,038,334 A | * | 3/2000 | Hamid | 382/124 |
| 6,108,438 A | * | 8/2000 | Bird et al. | 382/124 |
| 6,259,805 B1 | * | 7/2001 | Freedman et al. | 382/124 |

FOREIGN PATENT DOCUMENTS

| | | | |
|---|---|---|---|
| EP | 0 786 745 A2 | 7/1997 | G07C/9/00 |
| WO | WO 98/52146 | 11/1998 | G06K/9/20 |

OTHER PUBLICATIONS

Stefan Jung et al.: "A Low Power and High–Performance CMOS Fingerprint Sensing and Encoding Architecture", ESSCIRC '98, pp. 324–327.

* cited by examiner

Primary Examiner—Andrew W. Johns
Assistant Examiner—Amir Alavi
(74) Attorney, Agent, or Firm—Laurence A. Greenberg; Werner H. Stemer; Gregory L. Mayback

(57) ABSTRACT

The sensor is provided for the capacitive acquisition of images, in particular fingerprint images. The capacitors assigned to each pixel are supplemented by reference electrodes which are capacitively coupled to one another with coupling capacitances. Parallel acquisition of the image with the measuring electrodes and the additional reference electrodes yields, on the one hand, an image subdivided in accordance with the grid, and, on the other hand, local averaging resulting from the capacitive coupling is performed, which is used as a local reference value.

6 Claims, 3 Drawing Sheets

METHOD AND DEVICE FOR CAPACITIVE IMAGE ACQUISITION

CROSS-REFERENCE TO RELATED APPLICATION

This application is a continuation of copending International Application No. PCT/DE99/02727, filed Sep. 1, 1999, which designated the United States.

BACKGROUND OF THE INVENTION

FIELD OF THE INVENTION

The present invention relates to a method and a device for capacitive image acquisition which are suitable, in particular, for the acquisition of black-and-white images of fingerprints.

Various methods are known for realizing capacitive sensor arrays for recording fingerprint images. The publication by S. Jung et al.: "A Low-Power and High-Performance CMOS Fingerprint Sensing and Encoding Architecture" in ESSCIRC'98 describes a fingerprint sensor and associated measuring method which enables capacitive acquisition of the fingerprint. The effective capacitance between the finger surface and an upper electrode is acquired for each pixel. Below the upper electrodes there are not only the electrical leads but also respective coupling electrodes which are electrically insulated from the upper electrodes and form further capacitances with these electrodes. An electronic circuit is provided, which enables the respective coupling electrode to be charged to an envisaged potential and, via a switch, the upper measuring electrode to be charged to a different potential. After the switch is opened, specific charge and voltage ratios are established on the arrangement, which can be detected and serve for determining the respective capacitance at the relevant pixel. To ensure that this method yields an image representing the fingerprint and having a sufficient image quality, it is always necessary to calibrate the sensor or at least supply an external reference. These reference values are necessary in order to obtain from the continuous sensor data (i.e. the voltage values which are obtained by the sensor scheme and correspond to the capacitance values between finger surface and sensor surface) an image suitable for further processing, i.e. a discretized image. When the black-and-white image is to be recorded, very poor results may be obtained if the image becomes black or white in areas, because an inadequate contrast is produced on account of a shifted reference. That is practically unavoidable since either the sensor values or the values of the electrical parameters which lead for the voltage values determined from the capacitance values can vary locally. This difficulty can be circumvented in a highly complex manner by storing an image which is discretized in a multi-level manner and processing it further.

European published patent application EP 0 786 745 discloses a method and a device for capacitive image acquisition. There, a circuit for determining a local average value is provided, which is arranged separately from the image acquisition device.

SUMMARY OF THE INVENTION

The object of the present invention is to provide a fingerprint image acquisition device and method, which overcome the above-noted deficiencies and disadvantages of the prior art devices and methods of this general kind, and which make it possible, in a simple manner, to record a mosaic black-and-white image with a contrast sufficient for detail reproduction, in particular for the reproduction of fingerprints.

With the above and other objects in view there is provided, in accordance with the invention, a capacitive image acquisition method, which comprises:

providing a multiplicity of electrodes arranged in a grid and acquiring an image by measuring electrical capacitances between respective electrodes and image pixels;

acquiring, with further electrodes arranged in the grid and capacitively coupled to one another, a local average value of a corresponding measurement of the electrical capacitances in respectively delimited areas of the image; and utilizing the average value as a reference value for the measured electrical capacitance at at least one pixel within the relevant delimited area.

The novel method manages with a single-level binary analog-to-digital conversion of the measurement signals acquired. In order to compensate locally changing brightness or contrast differences, the capacitive measured values acquired for each pixel are subjected to a local threshold value comparison. This affords a reference which, as limit value, allows a single-level digital result (binary, 0 or 1) to be assigned to a measured value. The acquisition of the image by capacitive measurements and the determination of the threshold value resulting from the conditions of a respectively delimited excerpt from the image can be carried out simultaneously in parallel with this method. A device which can be used to carry out this method operates independently of external reference values and can be integrated e.g. for the purpose of acquiring fingerprints on a semiconductor chip.

For capacitive acquisition of the image, the procedure is, in principal, as described in the publication specified in the introduction. A grid-shaped arrangement of electrical conductors is used, which form counter electrodes to the surface of the image. The surface of the image may be e.g. the skin surface of a finger pad. The texturing of the skin surface into ridges and furrows thus results in locally different capacitances between the electrical conductors arranged in a plane as measuring electrodes and the skin surface, assumed to be at a constant electrical potential. Arranged at a greater distance from the image surface are further electrodes, as coupling electrodes, in a plane parallel to the first-mentioned electrodes. By applying suitable potentials and switching off the relevant potential of the electrodes arranged at a shorter distance from the image surface, it is possible to measure the capacitance between a respective measuring electrode of this type and the top side of the image at the relevant pixel in this case.

In the case of the method according to the invention, for measurement purposes, further electrodes are additionally used as reference electrodes which are each arranged adjacent to the actual measuring electrodes. The reference electrodes are arranged and dimensioned in such a way that, in principal, the same measurement can be carried out with them as with the actual measuring electrodes. However, by virtue of the arrangement and, if appropriate, the geometrical form, the reference electrodes are capacitively coupled to other reference electrodes, at least the directly adjacent ones to such a great extent that in the course of a measurement using these electrodes, averaging is effected around a pixel in each case over a certain area of the image. The average value acquired by means of the reference electrodes is used as a threshold value or limit value with which the respective measured value, which originates from the capacitive measurement using the actual measuring electrodes, is compared. With the average values, then, what is obtained, instead of a reference that is constant over the entire image area is a locally varying comparison value which yields a contrast sufficient for detail reproduction even in the case of a locally very light or very dark image.

In accordance with an added feature of the invention, the dimensions of the areas in which a respective average value is acquired within the image are varied.

In accordance with another feature of the invention, the average values are used as respective threshold values and, upon comparing a measured capacitance with the respective limit value, each pixel is assigned one of two possible values.

In accordance with an additional feature of the invention, the two possible values as black and white values. This allows a black-and-white image of a fingerprint the be acquired with the multiplicity of electrodes.

With the above and other objects in view there is also provided, in accordance with the invention, a device for capacitive acquisition of an image formed of pixels in a grid, which comprises:

a surface upon an image to be acquired is to be placed;

two layers of measuring electrodes formed as electrical conductors disposed at mutually different spacing distances from the surface, the electrical conductors being subdivided in accordance with the grid and mutually insulated;

the two layers including a first layer at a shorter distance from the surface, the first layer having further electrical conductors as reference electrodes disposed adjacent the measuring electrodes in accordance with the grid, and capacitively coupled within predetermined areas, such that a locally averaged capacitive measurement can be performed around each pixel with the reference electrodes; and electronic circuits connected to the measuring electrodes and reference electrodes for applying electrical potentials to the measuring electrodes and the reference electrodes in an identical manner for an intended measurement and for determining capacitances respectively present between a respective pixel and a respective electrode.

In accordance with a concomitant feature of the invention, the reference electrodes are comb-shaped structures intermeshed with comb-shaped structures of adjacent reference electrodes.

The electrical voltage applied to the measuring electrodes in the course of measurement may differ from the voltage applied to the reference electrodes. FIG. 1 illustrates a basic circuit diagram for an arrangement which is suitable for the method. Between the two layers of electrical conductors (measuring electrodes and coupling electrodes), the capacitances C12 are present in each pixel. The coupling electrodes are connected to the electrical potential V2. The top side of the image, e.g. the skin surface of the finger, is assumed to be at a constant potential VF. A specific potential is applied to the measuring electrodes and isolated from the electrodes by the actuation of switches. In accordance with the respective capacitance relations at the individual pixels, different values are established for the magnitude of the charge on the electrodes, which are measured in order to determine the respective capacitances between the measuring electrode and the top side of the image. In the case of measurement using the reference electrodes, the capacitances present between the electrodes need to be taken into account since these reference electrodes are arranged and configured in such a way that the coupling capacitances Ck depicted in FIG. 1 have non-negligible values. After the switching off of the voltage which is applied to the reference electrodes and may be identical to or different from the voltage applied to the measuring electrodes for the actual measurement, a value VG,ref,i corresponding to the electrode-pixel capacitance Cf,i is respectively established on the reference electrodes in each pixel. The capacitive measurement carried out in this way yields an as it were blurred or indistinct representation of the image to be acquired. The indeterminacy in the capacitive measurement caused by the capacitive coupling between the reference electrodes is utilized in order to use the local value of this measurement as a reference (reference value) in a comparison with the value determined by way of the measuring electrodes.

Other features which are considered as characteristic for the invention are set forth in the appended claims.

Although the invention is illustrated and described herein as embodied in a method and device for capacitive image acquisition, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
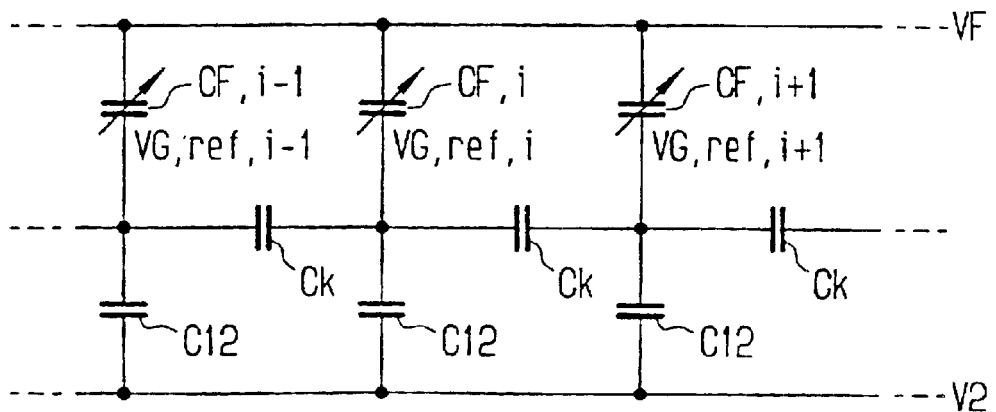
FIG. 1 is a basic circuit diagram for the averaging capacitive measurement of the method according to the invention.
Figure 2:
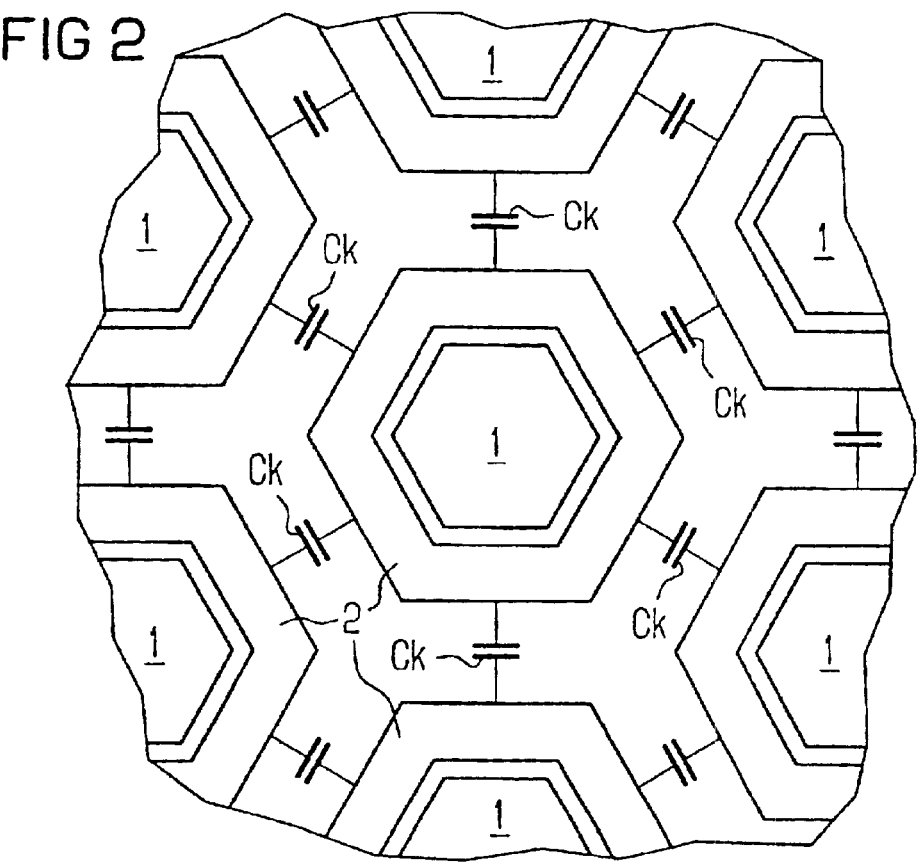
FIG. 2 is a diagrammatic plan view of an electrode arrangement suitable for the method.

Referring now to the figures of the drawing in detail and first, particularly, to FIG. 2 thereof, there is seen a detail of a grid-shaped assembly of hexagonal measuring electrodes 1 which are arranged on a hexagonal grid and are each annularly surrounded by reference electrodes 2 bordered by concentric hexagons. The coupling capacitances Ck between two respective reference electrodes are indicated as small capacitors in the diagram. These capacitors are not actually present, but rather only represent an equivalent circuit diagram for the capacitances which are in reality formed by the reference electrodes 2.

Figure 3:
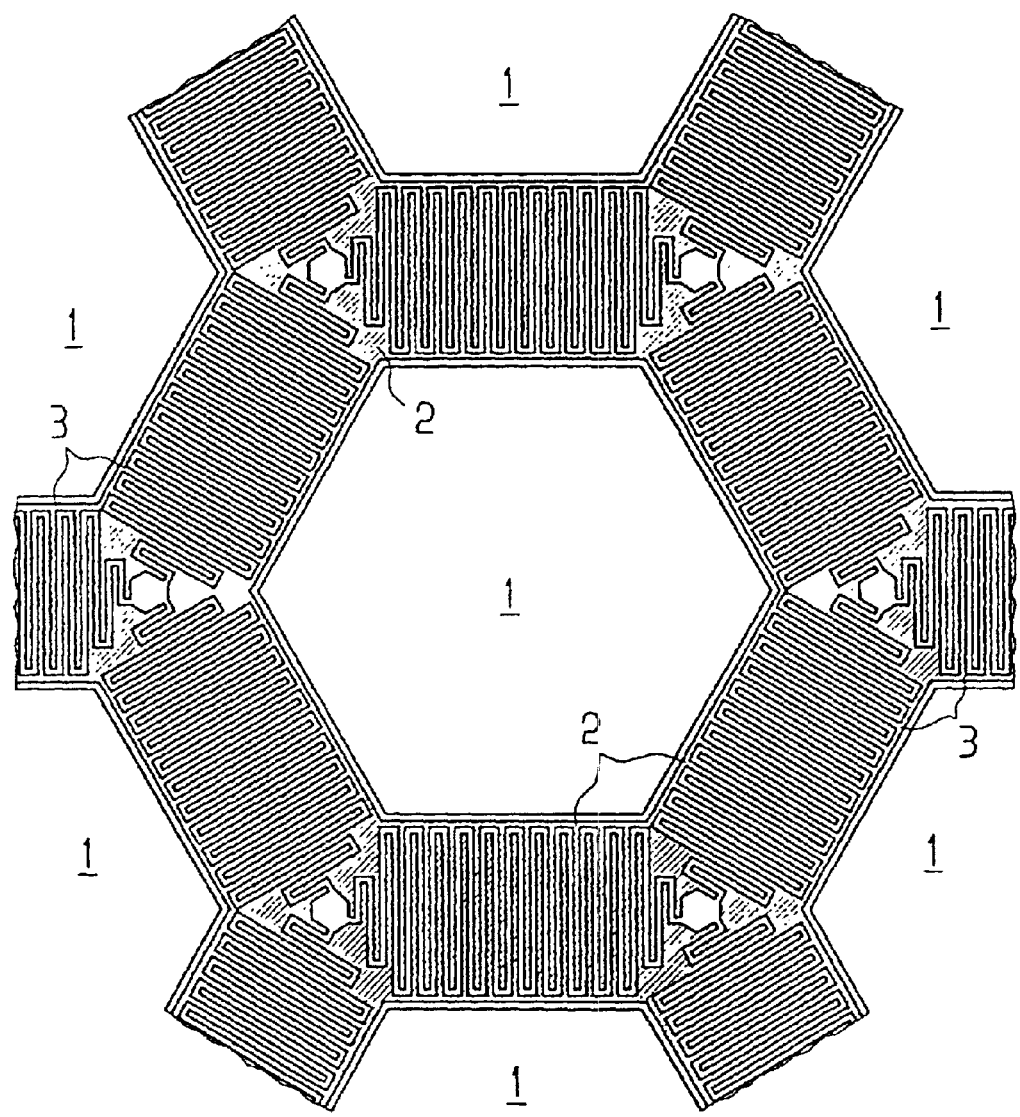
FIG. 3 is a more detailed plan view of an electrode assembly according to the invention.

FIG. 3 shows a view which corresponds to FIG. 2 and in which the structure of the reference electrodes 2 is specified in more detail in an exemplary embodiment. In this case, the reference electrodes 2 are designed in a comb-like manner and intermeshed with one another in such a way that the coupling capacitances between the reference electrodes of two adjacent pixels are as large as possible. In this way, the reference electrodes 2 form capacitors having a capacitance that is as large as possible with the reference electrodes 3 assigned to an adjacent pixel. Thus, the best possible averaging is achieved when the method is implemented using this arrangement. The fluctuations in the measured value from pixel to pixel, said fluctuations being given by the image structure, are thus largely compensated for, and essentially just one average value acquired over a plurality of pixels is measured.

In this method, therefore, the local image information acquired by means of the measuring electrodes is replaced, in the parallel measurement by way of the reference electrodes, by their local average value. The radius of the area over which averaging is performed, and the weighting of the local averaging depending on the position in the overall image, can be set through the ratios of the capacitances Ck and C12. The limiting cases here are Ck=0, which should result in an image which essentially corresponds to the image acquired by the measuring electrodes, and Ck infinity, with the result that the same potential is formed on each reference electrode, said potential corresponding to the global average value of the entire image. The capacitance ratios are to be matched to the respective application and, e.g. when using the method in a fingerprint sensor, are to be chosen such that the average value is determined over an area whose radius, preferably locally differently, is adapted to the typical groove structure of a fingerprint.

The arrangement of the measuring electrodes and reference electrodes should preferably be chosen to be identical for each pixel. Preferably identical electronic circuits are present which can apply the predetermined potentials to the electrodes in each pixel and switch them off. The potentials—forming in each pixel—on the measuring electrodes and reference electrodes are preferably compared using a comparator circuit. This comparison results in a black or white pixel of a black-and-white image, depending on whether the measured value lies below or above the relevant average value. The comparator circuit may be embodied e.g. as a dynamic latch.

The device can be realized as an integrated circuit, for which the hexagonal arrangement of the measuring electrodes specified as an example is particularly suitable. Owing to the dense organization of the measuring electrodes in such a grid with in each case mutually adjoining sides of the hexagons, the reference electrodes can be arranged particularly well there in order to form a coupling capacitance that is as large as possible.

Figure 4A:
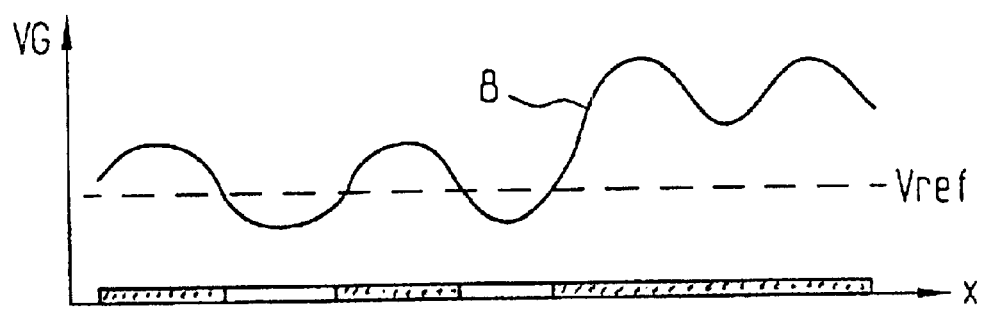
FIGS. 4A, 4B, and 4C are graphs illustrating the image quality improvement obtained with the novel method and device.
Figure 4B:
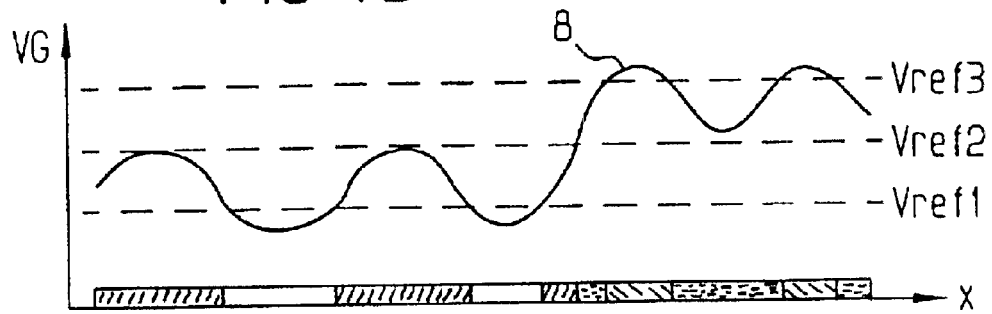
Figure 4C:
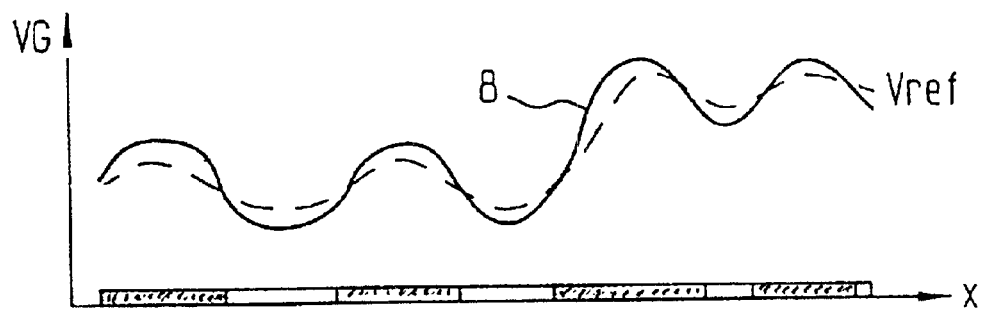

FIGS. 4A, 4B, and 4C are three diagrams that illustrate the method according to the invention. A first extent—designated by x—in one direction of the planar arrangement of measuring electrodes is plotted in an arbitrary unit on the abscissa; voltage values associated with the measured capacitances of the individual pixels are plotted as VG on the ordinate. The depicted curve 8 is intended to represent the voltage VG changing in the x-direction. Depending on whether the voltage value VG is greater than or less than a reference voltage Vref, the relevant pixel is represented as black or white. This can be discerned from FIG. 4A that when only one reference voltage Vref is used, the voltage VG always remains above the reference voltage in the right-hand region of the diagram, with the result that the image is represented uniformly black there. The voltage fluctuations (crests and troughs of the curve 8) are no longer taken into account, so that a detail resolution of the image is not possible at this point. More accurate reproduction of the image with grey gradations is possible if, in accordance with FIG. 4B, various reference voltages Vref1, Vref2, Vref 3 are used for generating an image gradated in the grey-scale values. However, such evaluation of the measurement results is associated with high complexity. The invention therefore proceeds in accordance with the illustration of FIG. 4C, in which the reference voltage Vref represented by the dashed line can be locally adapted to the conditions of the image by the averaging and thus, even in the area depicted on the right, the fluctuations of the voltage VG can be used for brightness values, i.e. a black-and-white gradation, of the image. This reference voltage Vref is determined in the manner described by averaging using the capacitively coupled reference electrodes.

I claim:

1. A capacitive image acquisition method, which comprises:

providing a multiplicity of electrodes arranged in a grid and acquiring an image by measuring electrical capacitances between respective electrodes and image pixels;

acquiring, with further electrodes arranged in the grid and capacitively coupled to one another, a local average value of a corresponding measurement of the electrical capacitances in respectively delimited areas of the image; and utilizing the average value as a reference value for the measured electrical capacitance at at least one pixel within the relevant delimited area.

2. The method according to claim 1, which further comprises varying dimensions of the areas in which a respective average value is acquired within the image.

3. The method according to claim 1, which comprises using the average values as respective threshold values and, upon comparing a measured capacitance with the respective limit value, assigning each pixel one of two possible values.

4. The method according to claim 3, which comprises defining the two possible values as black and white values, and acquiring a black-and-white image of a fingerprint with the multiplicity of electrodes.

5. A device for capacitive acquisition of an image formed of pixels in a grid, which comprises:

a surface upon which an image to be acquired is to be placed;

two layers of measuring electrodes formed as electrical conductors disposed at mutually different spacing distances from said surface, said electrical conductors being subdivided in accordance with the grid and mutually insulated;

said two layers including a first layer at a shorter distance from the surface, said first layer having further electrical conductors as reference electrodes disposed adjacent said measuring electrodes in accordance with the grid, and capacitively coupled within predetermined areas, such that a locally averaged capacitive measurement can be performed around each pixel with said reference electrodes; and electronic circuits connected to said measuring electrodes and reference electrodes for applying electrical potentials to said measuring electrodes and said reference electrodes in an identical manner for an intended measurement and for determining capacitances respectively present between a respective pixel and a respective electrode.

6. The device according to claim 5, wherein said reference electrodes are comb-shaped structures intermeshed with comb-shaped structures of adjacent said reference electrodes.

* * * * *